United States Patent
Inoue et al.

(10) Patent No.: US 7,284,765 B1
(45) Date of Patent: Oct. 23, 2007

(54) TORSION BEAM SUSPENSION

(75) Inventors: Mitsuru Inoue, Tochigi (JP); Fumio Kikuchi, Tochigi (JP)

(73) Assignee: E. Tech Incorporation, Saitama (JP)

( * ) Notice: Subject to any disclaimer, the term of this patent is extended or adjusted under 35 U.S.C. 154(b) by 0 days.

(21) Appl. No.: 11/607,091

(22) Filed: Dec. 1, 2006

(51) Int. Cl.
 *B60G 11/20* (2006.01)
(52) U.S. Cl. .............................................. 280/124.166
(58) Field of Classification Search ......... 280/124.166, 280/124.116, 124.128, 124.13, 124.132; 29/897.2; 301/125, 132
 See application file for complete search history.

(56) References Cited

U.S. PATENT DOCUMENTS 4,232,881 A * 11/1980 Kolbel et al. ......... 280/124.128
6,047,978 A * 4/2000 Watanabe et al. ..... 280/124.106

FOREIGN PATENT DOCUMENTS

JP          10-236123 A      9/1998

\* cited by examiner

*Primary Examiner*—Faye M. Fleming
(74) *Attorney, Agent, or Firm*—Arent Fox, LLP (57) ABSTRACT

In a torsion beam suspension including: a pair of left and right trailing arms 1; a torsion beam 2 providing connection between the trailing arms 1; and gussets 3 which are U-shaped in section and substantially triangular in plane view and which are welded to inner side surfaces of connecting portions between the trailing arms 1 and the torsion beam 2, seat surfaces 9 are formed by crushing at left and right opposite end portions of a rear wall 2a of the torsion beam 2, the seat surfaces 9 being offset forward from a general outer surface of the rear wall 2a by an amount e larger than a plate thickness t of the gussets 3, and each gusset 3 includes an inner end edge portion 3d superposed on an intermediate portion in a lateral direction of the seat surface 9, and upper and lower front edge portions 3c, 3c connected by a weld W3 to upper and lower portions of an outer surface of the torsion beam 2. Thus, in the torsion beam, an abrupt increase in torsional rigidity is suppressed in the gusset inner end portion without reducing strength of the torsion beam to alleviate stress concentration, thereby providing a torsion beam suspension having a high durability.

3 Claims, 7 Drawing Sheets

TORSION BEAM SUSPENSION

BACKGROUND OF THE INVENTION

1. Field of the Invention

The present invention relates to a torsion beam suspension of an automobile, and particularly relates to an improvement of a torsion beam suspension comprising: a pair of left and right trailing arms which are pivotally supported at their front end portions on a vehicle body, and which support wheels at their rear end portions; a torsion beam which has left and right opposite end portions connected to the trailing arms by welds, and which causes torsion when the trailing arms swing in opposite phases; and gussets which are U-shaped in section and substantially triangular in plane view, and which are connected by welds to inner side surfaces of connecting portions between the trailing arms and the torsion beam.

2. Description of the Related Art

Such a torsion beam suspension is already known as disclosed in Japanese Patent Application Laid-open No. 10-236123.

In the torsion beam suspension, gussets which are U-shaped in section and substantially triangular in plane view are connected by welding to inner side surfaces of connecting portions between trailing arms and a torsion beam, the gussets enhancing torsional rigidity of the connecting portions in order to prevent concentration of stress on the connecting portions between the trailing arms and the torsion beam at the time of torsional deformation of the torsion beam. However, in such a torsion beam suspension, the torsional rigidity abruptly increases in the region of the torsion beam where the inner end portion of the gusset is welded, and torsional stress concentrates thereon.

Thus, in the device disclosed in the above described Japanese Patent Application Laid-open No. 10-236123, the torsion beam is provided with a fragile portion comprising a recess at the portion in front of the gusset tip end portion, thereby alleviating stress concentration on the above described region. However, even if such a fragile portion is provided, torsion rigidity in the inner end portion of the gusset does not change as long as the inner end portion of the gusset is connected to the portion beyond the fragile portion. Therefore, there is rather a fear of significantly reducing the strength of the torsion beam because of cooperation between the stress concentration on the fragile portion and the stress concentration on the inner end portion of the gusset. If the plate thickness of the torsion beam is increased to compensate for the reduction in strength, the weight and cost are disadvantageously increased.

SUMMARY OF THE INVENTION

The present invention has been achieved in view of the above circumstances, and has an object to provide a torsion beam suspension having a high durability without reducing strength of a torsion beam, in which an abrupt increase in torsional rigidity, that is, geometrical moment of inertia at a gusset inner end portion of the torsion beam is suppressed.

In order to achieve the above object, according to a first feature of the present invention, there is provided a torsion beam suspension comprising: a pair of left and right trailing arms which are pivotally supported at their front end portions on a vehicle body, and which support wheels at their rear end portions; a torsion beam which has left and right opposite end portions connected to the trailing arms by welds, and which causes torsion when the trailing arms swing in opposite phases; and gussets which are U-shaped in section and substantially triangular in plane view, and which are connected by welds to inner side surfaces of connecting portions between the trailing arms and the torsion beam, characterized in that the torsion beam is formed into a U-shape in section with an open surface facing forward, and seat surfaces are formed by crushing at left and right opposite end portions of a rear wall of the torsion beam, the seat surfaces being offset forward from a general outer surface of the rear wall by an amount larger than a plate thickness of the gussets; and that each gusset includes an inner end edge portion superposed on an intermediate portion in a lateral direction of the seat surface, and upper and lower front edge portions connected by a weld to an outer surface of the torsion beam at upper and lower portions of the seat surface.

With the first feature of the present invention, the rear surface of the inner end edge portion of the gusset occupies a position which is offset forward from the general outer surface of the rear wall of the torsion beam only by an amount corresponding to the difference between the offset amount of the seat surface and the plate thickness of the gusset, so that the geometrical moment of inertia at the inner end edge portion of the gusset of the torsion beam can be made equal to or smaller than the geometrical moment of inertia at the general outer surface portion of the rear wall. Accordingly, at the time of torsional deformation of the torsion beam, stress concentration on the inner end edge portion of the gusset in the torsion beam can be effectively alleviated. Further, since a fragile portion does not exist in the torsion beam, strength of the torsion beam is not reduced, and a particular increase in the plate thickness is not required, thus contributing to reduction in weight and cost of the torsion beam suspension.

According to a second feature of the present invention, in addition to the first feature, the inner end edge portion of the gusset is superposed on the seat surface without being welded thereto.

With the second feature of the present invention, the gussets can be welded to the torsion beam while avoiding stress concentration on the seat surface, thereby securing strength of the torsion beam.

According to a third feature of the present invention, in addition to the first or second feature, the general outer surface of the rear wall of the torsion beam and the seat surface are connected to each other via a slant surface and arc surfaces connected to opposite ends of the slant surface.

With the third feature of the present invention, the geometrical moment of inertia of the torsion beam changes relatively gradually from the general outer surface of the rear wall to the seat surface, and stress concentration on these parts can be alleviated, thus contributing to securing strength of the torsion beam.

The above-mentioned object, other objects, characteristics, and advantages of the present invention will become apparent from preferred embodiments, which will be described in detail below by reference to the attached drawings.

DESCRIPTION OF THE PREFERRED EMBODIMENTS

Preferred embodiments of the present invention will now be described based on the attached drawings.

Figure 1:
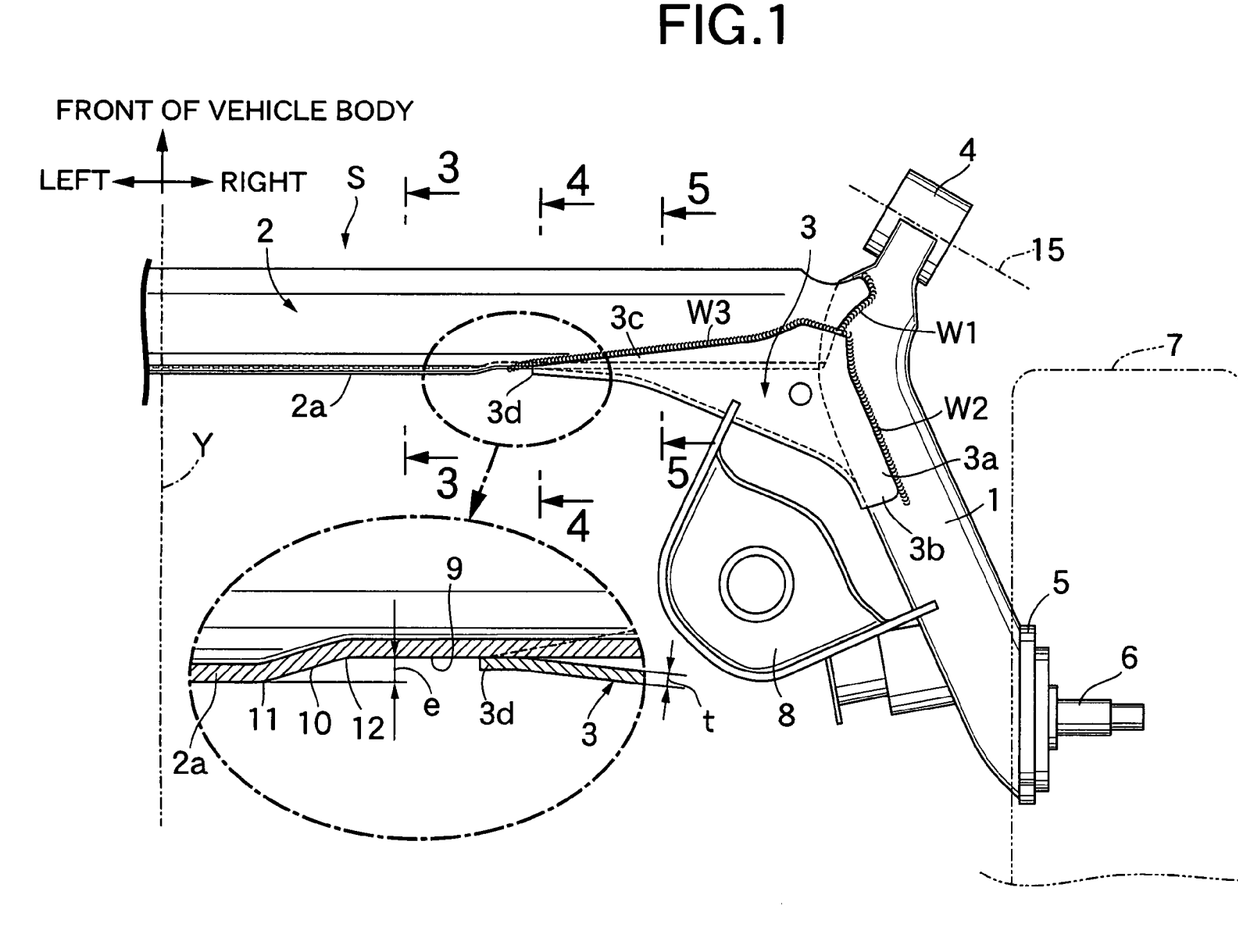
FIG. 1 is a plane view of a right half of a torsion beam suspension for rear wheels of an automobile according to a first embodiment of the present invention.

First, in FIG. 1, a torsion beam suspension S which suspends left and right rear wheels 7 and 7 is mounted on a vehicle body (not shown) of an automobile. The torsion beam suspension S has a laterally symmetric structure with respect to a center line Y extending in a longitudinal direction of the vehicle body. The torsion beam suspension S comprises: a pair of left and light trailing arms 1 and 1 extending in the longitudinal direction of the vehicle body; a torsion beam 2 which extends in a lateral direction of the vehicle body, has opposite ends connected by welds W1 to the left and right trailing arms 1 and 1, and torsionally deforms when the trailing arms 1 and 1 swing in opposite phases; and gussets 3 which are connected by welds W2 and W3 to inner side surfaces of connecting portions between the trailing arms 1 and the torsion beam 2.

A cylindrical arm support tube 4 is welded to a front end of each of the trailing arms 1. The arm support tube 4 is rotatably supported via a rubber bush (not shown) on a pivotal shaft 15 which is fixed to the vehicle body. Accordingly, each of the trailing arms 1 is capable of vertically swinging around the pivotal shaft 15. A spindle support plate 5 is welded to an outer side surface of a rear end portion of each of the trailing arms 1 so that the rear wheel 7 is rotatably supported by a spindle 6 fixedly provided on the plate 5. A spring seat member 8 which supports a lower end of a suspension spring (not shown) is welded to an inner side surface of an intermediate portion of each of the trailing arms 1.

Figure 2:
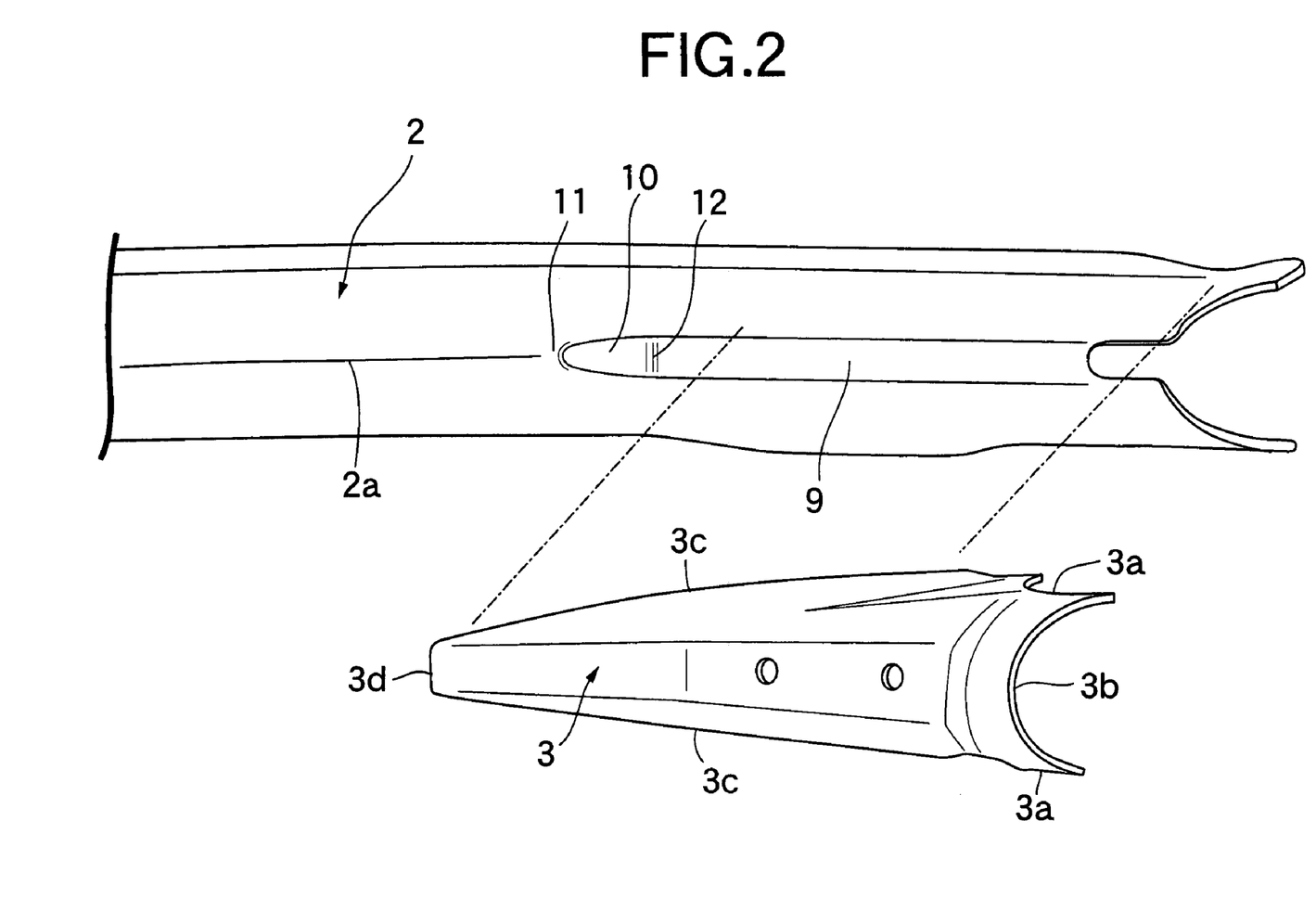
FIG. 2 is an exploded perspective view of a torsion beam and a gusset of the torsion beam suspension.
Figure 3:
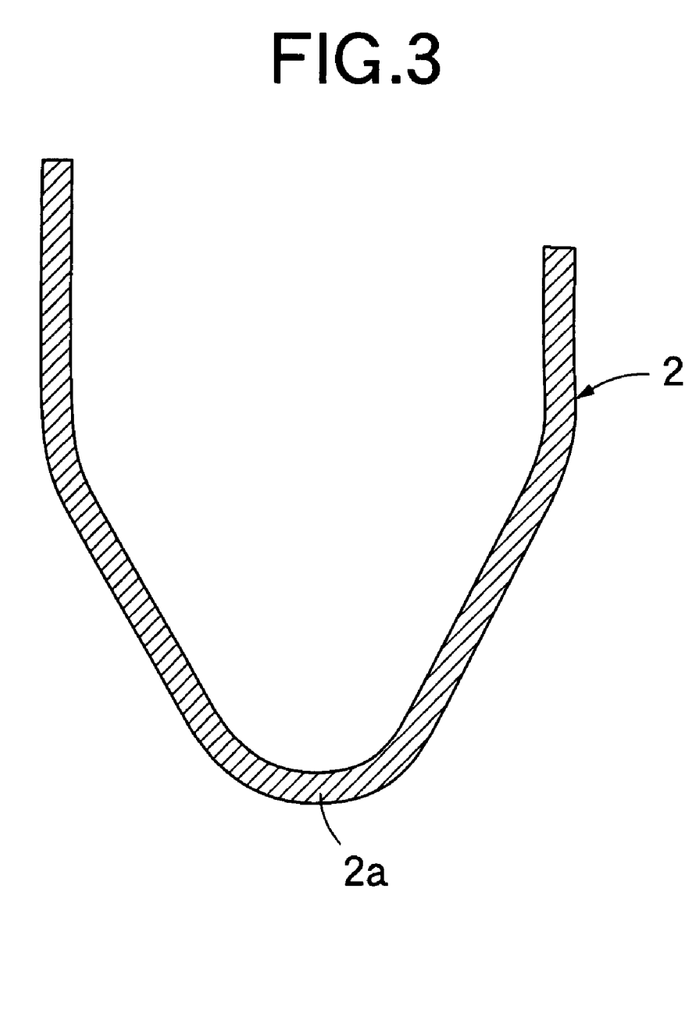
FIG. 3 is a sectional view taken along line 3-3 in FIG. 1.
Figure 4:
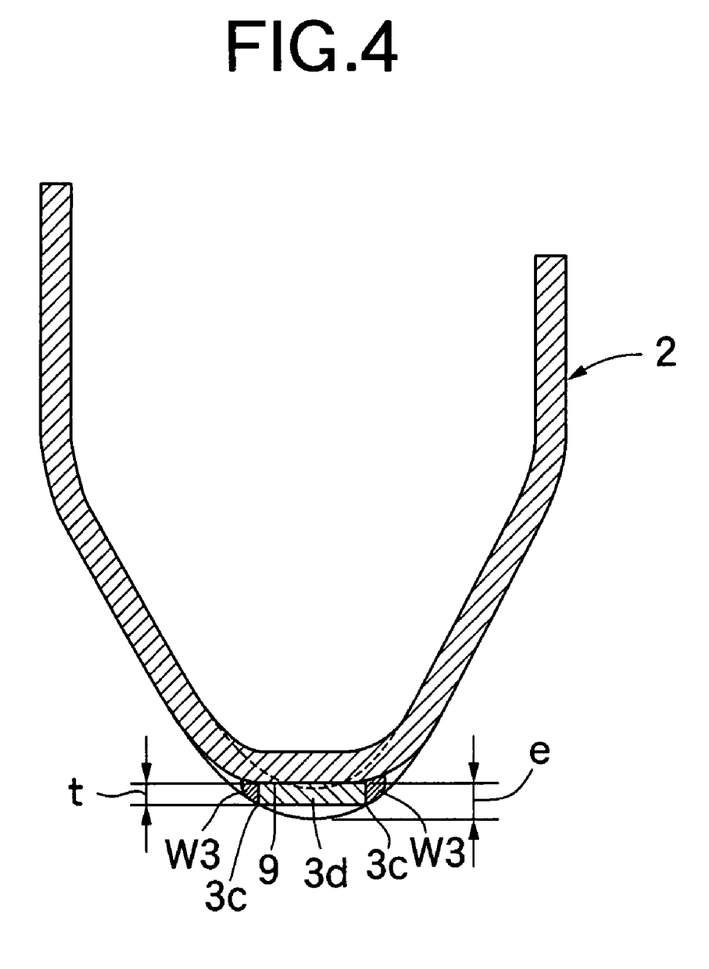
FIG. 4 is a sectional view taken along line 4-4 in FIG. 1.
Figure 5:
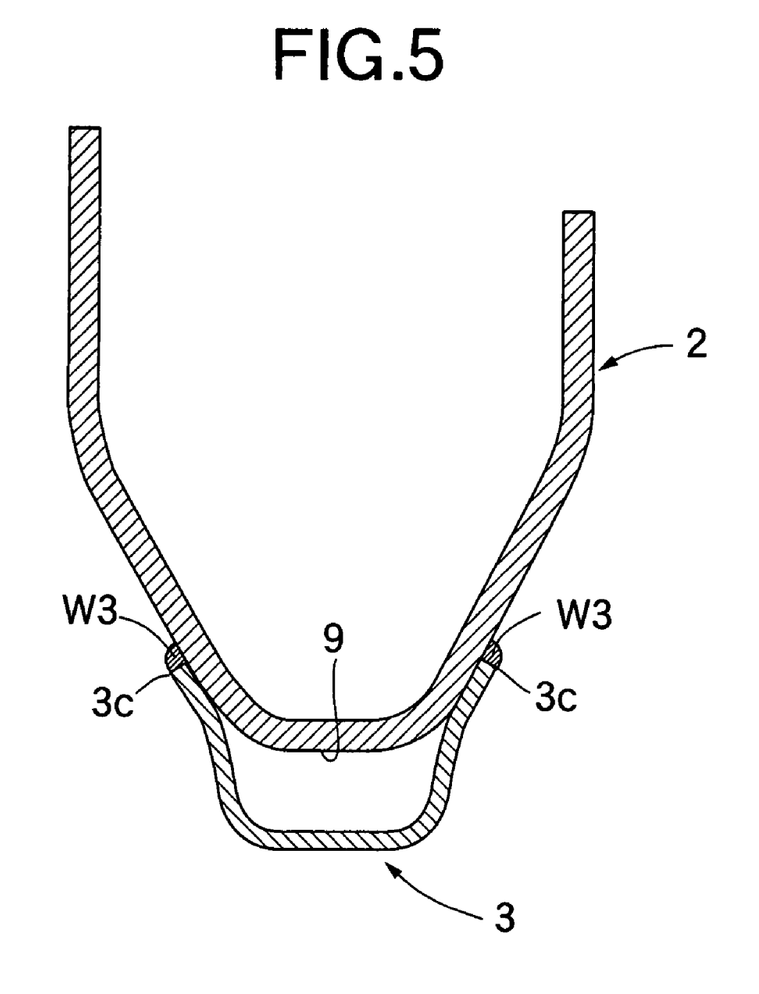
FIG. 5 is a sectional view taken along line 5-5 in FIG. 1.

As shown in FIGS. 2 to 4, the torsion beam 2, which extends in the lateral direction of the vehicle body, forms a U-shape in section with its front surface side facing a front of the vehicle body opened; and a flat seat surface 9, which is offset forward from a general outer surface of a rear wall 2a by an amount larger than a plate thickness t of the gusset 3, is formed by crushing at each of left and right opposite end portions of the rear wall 2a. A reference symbol e designates a forward offset amount of the seat surface 9, establishing e>t. The general outer surface of the rear wall 2a and the seat surface 9 are smoothly connected to each other via a slant surface 10 and arc surfaces 11 and 12 at the opposite ends of the slant surface 10.

In the seat surface, an outer end portion on a side opposite from the slant surface 10 may be extended to an end portion of the torsion beam 2, or the outer end portion may be terminated at an appropriate position in front of the end portion of the torsion beam 2.

Figure 7:
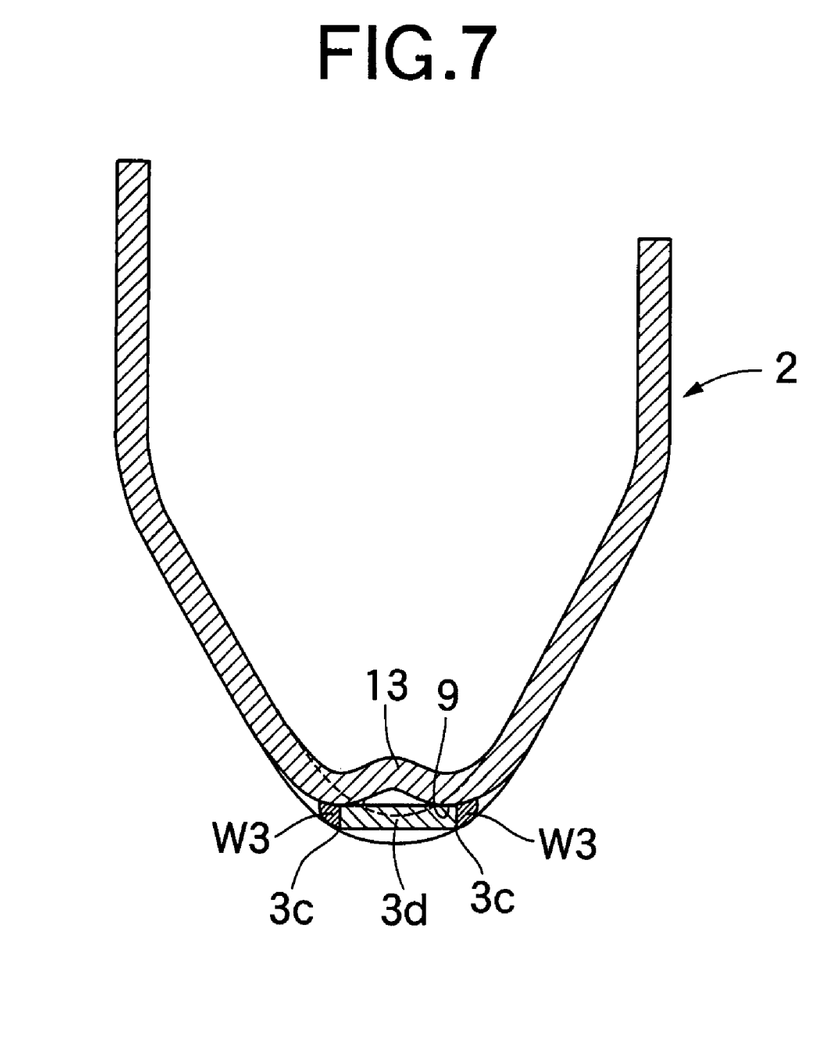
FIG. 7 is a view corresponding to FIG. 4, and showing a third embodiment of the present invention.

A crease 13 recessed inward may be imparted to the seat surface 9 in a central portion in the width direction as shown in FIG. 7.

As shown in FIGS. 1 and 2, each of the gussets 3 forms a U-shape in section with a front side and a side opened; and forms a substantially right triangle in plane view, including a pair of upper and lower side edge portions 3a and 3a along the longitudinal direction of the trailing arm 1; a rear end edge portion 3b which provides connection between rear ends of the side edge portions 3a and 3a; a pair of upper and lower front edge portions 3c and 3c which extend from the side edge portions 3a and 3a to the inner ends while inclining rearward; and an inner end edge portion 3d which connects inner ends of the front edge portions 3c and 3c. The side edge portions 3a and 3a are connected by the weld W2 to the upper and lower surfaces and the inner surface of the trailing arm 1. The front edge portions 3c and 3c are connected by the weld W3 to the upper and lower outer surfaces of the seat surface 9 of the torsion beam 2. The rear end edge portion 3b is simply superposed on the trailing arm 1 without being welded thereto. The inner end edge portion 3d is also simply superposed on the intermediate portion in the lateral direction of the seat surface 9 without being welded thereto.

Figure 6:
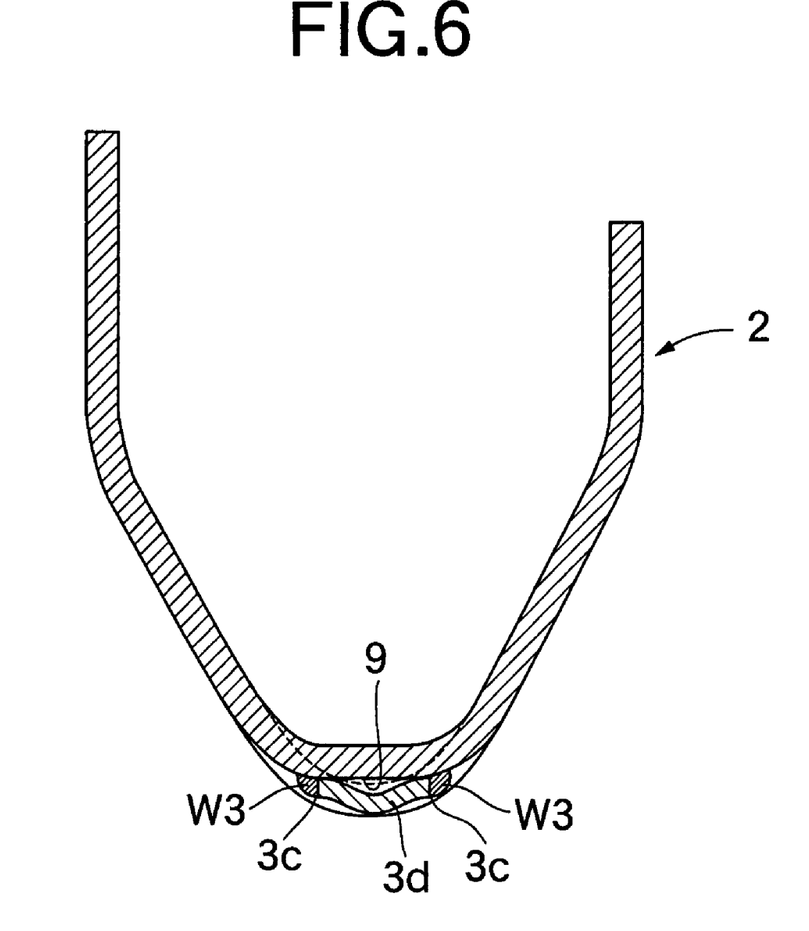
FIG. 6 is a view corresponding to FIG. 4, and showing a second embodiment of the present invention.

In this case, the portion of the inner end edge portion 3d which is superposed on the seat surface 9 may be flat as shown in FIGS. 1 and 4, and may have an intermediate portion formed into a shape protruding to the rear side as shown in FIG. 6.

Thus, the seat surface 9 is offset forward from the general outer surface of the rear wall 2a of the torsion beam 2 by the amount larger than the plate thickness t of the gusset 3 (offset amount: e), and therefore the rear surface of the inner end edge portion 3d of the gusset 3 also occupies a position offset forward from the general outer surface of the rear wall 2a of the torsion beam 2 by the amount of (e-t).

Next, an operation of the embodiment will be described.

When loads acting on the rear wheels 7 and 7 change under the same conditions during traveling of the automobile, for example, when the left and right rear wheels 7 and 7 ride over protrusions of the same height or pass through recesses of the same depth, the trailing arms 1 and 1 swing in the vertical direction in the same phase around the pivotal shafts 15, and therefore torsion does not occur to the torsion beam 2.

When a difference occurs between the loads acting on the left and right rear wheels 7 and 7, for example, when the left and the right rear wheels 7 and 7 ride over protrusions having different heights or when only one of the rear wheels 7 rides over a protrusion or passes through a recess, the trailing arms 1 swing in the vertical direction in opposite phases around the pivotal shafts 15 while imparting torsional deformation to the torsion beam 2. Therefore, followability of each of the rear wheels 7 and 7 to the road surface is enhanced, thereby providing an excellent favorable riding comfort.

However, when the difference between the loads acting on the left and right rear wheels 7 and 7 is large at the time of turning or the like so that relative swing of the trailing arms 1 and 1 becomes excessive, the torsional reaction force of the torsion beam 2 increases accordingly to suppress increase in the relative swing amounts of the trailing arms 1 and 1, thereby preventing an excessive rolling of the vehicle body.

Now, stress of each part which occurs at the time of torsional deformation of the torsion beam 2 will be discussed.

The geometrical moment of inertia of the torsion beam 2 decreases from the general outer surface portion of the rear wall 2a toward the portion of the slant surface 10 and the portion of the seat surface 9 where no gusset 3 is provided, and starts to increase at the connecting portion to the gusset 3.

However, the rear surface of the inner end edge portion 3d of the gusset 3 occupies the position which is offset forward from the general outer surface of the rear wall 2a of the torsion beam 2 by the amount of (e-t) as described above, and thus the geometrical moment of inertia of the torsion beam 2 at the inner end edge portion 3*d* of the gusset 3 can be made equal to or smaller than the geometrical moment of inertia at the general outer surface portion of the rear wall 2*a*. Therefore, at the time of torsional deformation of the torsion beam 2, stress concentration on the torsion beam 2 in the inner end edge portion 3*d* of the gusset 3 can be effectively alleviated. In addition, a fragile portion as disclosed in Japanese Patent Application Laid-open No. 10-236123 does not exist in the torsion beam 2. Thus, a light and less expensive torsion beam suspension S can be provided without reducing the strength of the torsion beam 2 and without requiring a particular increase of its plate thickness.

Since in the gusset 3, its inner end edge portion 3*d* is superposed on the seat surface 9 of the torsion beam 2 without being welded thereto, and the upper and the lower front edge portions 3*c* and 3*c* are connected by the weld W3 to the upper and lower outer surfaces of the seat surface 9, the gusset 3 can be welded to the torsion beam 2 while avoiding stress concentration on the seat surface 9, thereby securing strength of the torsion beam 2.

Further, since the general outer surface of the rear wall 2*a* of the torsion beam 2 and the seat surface 9 offset forward from the general outer surface are smoothly connected to each other via the slant surface 10 and the arc surfaces 11 and 12 connected to the opposite ends slant surface 10, the geometrical moment of inertia of the torsion beam 2 changes relatively gradually from the general outer surface of the rear wall 2*a* to the seat surface 9, and therefore stress concentration on these portions can be alleviated, whereby strength of the torsion beam 2 can be also secured.

The present invention is not limited to the above described embodiments and various changes in design can be made without departing from the subject matter of the present invention. For example, in the above described embodiments, the pivotal shaft 15 is inclined with respect to the horizontal line in the lateral direction, but it may be disposed parallel with the horizontal line in the lateral direction.

What is claimed is:

1. A torsion beam suspension comprising:
a pair of left and right trailing arms (1) which are pivotally supported at their front end portions on a vehicle body, and which support wheels (7) at their rear end portions;
a torsion beam (2) which has left and right opposite end portions connected to the trailing arms (1) by welds (W1), and which causes torsion when the trailing arms (1) swing in opposite phases; and
gussets (3) which are U-shaped in section and substantially triangular in plane view, and which are connected by welds (W2, W3) to inner side surfaces of connecting portions between the trailing arms (1) and the torsion beam (2),
characterized in that the torsion beam (2) is formed into a U-shape in section with an open surface facing forward, and seat surfaces (9) are formed by crushing at left and right opposite end portions of a rear wall (2*a*) of the torsion beam (2), the seat surfaces (9) being offset forward from a general outer surface of the rear wall (2*a*) by an amount (e) larger than a plate thickness (t) of the gussets (3); and
that each gusset (3) includes an inner end edge portion (3*d*) superposed on an intermediate portion in a lateral direction of the seat surface (9), and upper and lower front edge portions (3*c*, 3*c*) connected by a weld (W3) to an outer surface of the torsion beam (2) at upper and lower portions of the seat surface (9).

2. The torsion beam suspension according to claim 1, characterized in that the inner end edge portion (3*d*) of the gusset (3) is superposed on the seat surface (9) without being welded thereto.

3. The torsion beam suspension according to claim 1 or 2, characterized in that the general outer surface of the rear wall (2*a*) of the torsion beam (2) and the seat surface (9) are connected to each other via a slant surface (10) and arc surfaces (11, 12) connected to opposite ends of the slant surface (10).

* * * * *

UNITED STATES PATENT AND TRADEMARK OFFICE
CERTIFICATE OF CORRECTION

PATENT NO. : 7,284,765 B1  
APPLICATION NO. : 11/607091  
DATED : October 23, 2007  
INVENTOR(S) : Mitsuru Inoue et al.

Page 1 of 1

It is certified that error appears in the above-identified patent and that said Letters Patent is hereby corrected as shown below:

Title Page -

Item [73] Assignee, please correct the Assignee's name to read as follows:

-- F. Tech Incorporation --.

Signed and Sealed this

First Day of April, 2008

JON W. DUDAS  
*Director of the United States Patent and Trademark Office*